No. 674,690. Patented May 21, 1901.
A. WIENRICH.
FOLDING EYEGLASSES.
(Application filed Aug. 30, 1899.)
(No Model.)
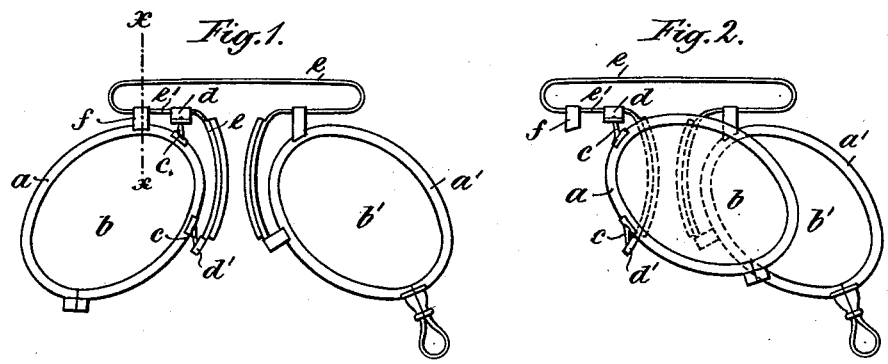
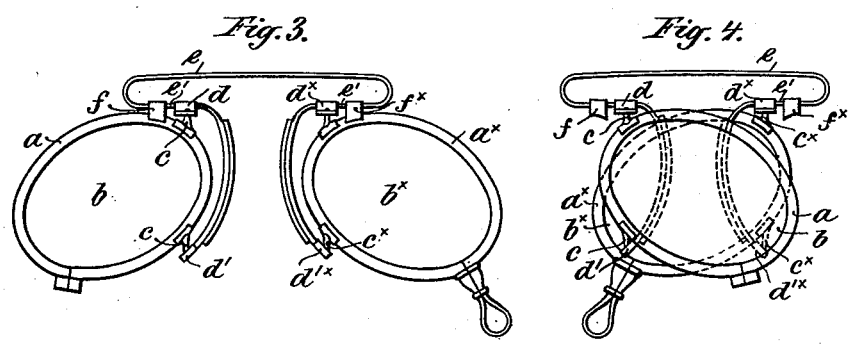
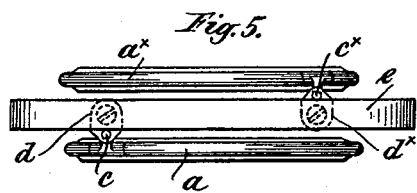

UNITED STATES PATENT OFFICE.

ALEX WIENRICH, OF BERLIN, GERMANY.

FOLDING EYEGLASSES.

SPECIFICATION forming part of Letters Patent No. 674,690, dated May 21, 1901.

Application filed August 30, 1899. Serial No. 728,948. (No model.)

*To all whom it may concern:*

Be it known that I, ALEX WIENRICH, merchant, a subject of the Emperor of Germany, residing at 183 Oranienstrasse, Berlin, in the Empire of Germany, have invented certain new and useful Improvements in Folding Eyeglasses, of which the following is a specification.

Eyeglasses of ordinary construction are too bulky to be carried in the pocket of the waistcoat or the coat with ease. This defect has to some extent been overcome by folding the glasses one over the other; but this causes a heavy strain on the spring and renders them untrue. Again, the spring has been divided in the middle and provided with a hinge-joint, so as to enable the lenses to be turned one against the other; but this arrangement has not met with general favor. According to my invention I neither divide the spring nor do I cause the same to be submitted to undue stress or to any stress whatever for folding.

My invention will be clearly understood by reference to the accompanying drawings, in which—

Figure 1 is an elevation of the folders when ready for use. Fig. 2 is a similar view of the same when folded. Fig. 3 is a modified construction in which both glasses are adapted to fold over. Fig. 4 shows the same in its folded position. Fig. 5 is a plan of Fig. 4 drawn to an enlarged scale, and Fig. 6 is a section taken on the line $x\ x$ of Fig. 1.

In carrying out my invention I so hinge or pivot one or both lenses that one or each of them may be turned from its normal position to a position partially eclipsing the normal position of the other independently of the nose-clamps and, preferably, without flexing the spring which connects the nose-clamps together.

The frame $a$ of the glass $b$, Figs. 1 and 2, is furnished with two pins or pivots $c\ c$, arranged in a straight line parallel with the plane of the lenses. The ends of these pins are each mounted in a bearing in blocks $d\ d'$, which latter are both fixed to the branch $e'$ of the mainspring $e$ and which branches $e'$ also carry or constitute the nose-clamps, so that the hinged or pivoted lens will be movable independently of and fold over the nose-clamps.

From a glance at the drawings it will at once be clear that the folding operation presents no difficulties and that the space occupied by the eyeglasses arranged as in Fig. 2 is much less than that in Fig. 1. The glass is held in its extended position by a block $f$, (shown separately in Fig. 6,) which is attached to the frame. This block $f$ is formed on its under side with a groove $i$, into which the frame of the glass slips and in which it is retained by the action of the branch $e'$. (See Fig. 6.) A slight downward pressure with the finger upon the frame $b$ releases the glass from the block $f$ and allows the glass to be folded. The block $f$ for retaining or locking the glass in its position for use may, however, be replaced by any other suitable device.

The arrangement may be modified so as to render both glasses foldable and so enable the folder to be folded into a still smaller compass, and thus more easily carried in the pocket. This last arrangement is shown in the position for use in Fig. 3 and folded in Fig. 4, while Fig. 5 shows a plan thereof. The means for the folding of the glasses are the same as that described with reference to Figs. 1 and 2; but naturally the glasses must be constructed to swing in opposite direction, as indicated at Fig. 5, so as to enable them when folded to lie side by side. This is effected by placing the pivots $c\ c$ and $c^\times\ c^\times$ at the opposite sides of the spring $e$ instead of in the center plane of such spring.

I do not intend to claim any means for keeping the glasses in their folded position, as naturally any means suitable for the purpose may be adopted.

What I claim is—

1. In a pair of folding eyeglasses the combination of the lenses, means for supporting the same on the nose, means for hinging one of said lenses to said supporting means on an axis arranged in the plane of the lenses and a spring-actuated catch for holding the hinged lens in operative position arranged to engage the edge thereof, substantially as set forth.

2. In a pair of folding eyeglasses the combination of the nose-clamps and two lenses pivotally connected together, one of said lenses being movable independently of said nose-clamps from its normal position to a position partially eclipsing the normal position of the other lens, substantially as set forth.

3. In a pair of folding eyeglasses the combination of connected nose-clamps and the lenses to which said clamps are connected, one of said lenses being pivoted on an axis extending in a plane therewith and movable toward and independently of said nose-clamps from its normal position to a position partially eclipsing and parallel with the normal position of the other lens, substantially as set forth.

4. In a pair of folding eyeglasses the combination of connected nose-clamps and the lenses arranged in substantially the same plane as both of said nose-clamps and one of which lenses is pivoted independently of said nose-clamps on an axis extending substantially in the same plane as the pivoted lens, and foldable flat against both nose-clamps and the other lens, substantially as set forth.

5. In a pair of folding eyeglasses, the combination of connected nose-clamps and two pivoted lenses each movable independently of said nose-clamps from its normal position to a position partially eclipsing the normal position of the other, substantially as set forth.

6. In a pair of folding eyeglasses the combination of the nose-clamps, two pivoted lenses, one of said lenses being movable independently of said nose-clamps from its operative position to a position partially eclipsing the normal position of the other lens and a catch for holding said pivoted lens in its normal position, substantially as set forth.

7. In a pair of folding eyeglasses the combination of the nose-clamps and two lenses, a spring connecting said nose-clamps and lying in the same plane as said lenses, one of said lenses being pivoted and thereby movable independently of said nose-clamps from its normal position to a position partially eclipsing the normal position of the other lens, substantially as set forth.

8. In a pair of folding eyeglasses the combination of the nose-clamps, a spring connecting said clamps together, two lenses connected with said spring and one of which is pivoted and thereby movable independently of said nose-clamps and from its normal position to a position partially eclipsing the normal position of the other lens, and a catch carried by said spring for engaging said movable lens and holding it in its normal position, substantially as set forth.

In testimony whereof I have hereunto set my hand, in presence of two subscribing witnesses, this 14th day of August, 1899.

ALEX WIENRICH.

Witnesses:
  HENRY HASPER,
  WILLIAM MAYNER.